United States Patent
Sapire

(10) Patent No.: US 10,898,028 B2
(45) Date of Patent: Jan. 26, 2021

(54) MIXER WITH SAFETY MECHANISMS

(71) Applicant: Capbran Holdings, LLC, Los Angeles, CA (US)

(72) Inventor: Colin Sapire, Los Angeles, CA (US)

(73) Assignee: Capbran Holdings, LLC, Los Angeles, CA (US)

(*) Notice: Subject to any disclaimer, the term of this patent is extended or adjusted under 35 U.S.C. 154(b) by 157 days.

(21) Appl. No.: 15/921,515

(22) Filed: Mar. 14, 2018

(65) Prior Publication Data

US 2019/0000275 A1 Jan. 3, 2019

Related U.S. Application Data

(60) Provisional application No. 62/527,945, filed on Jun. 30, 2017.

(51) Int. Cl.
| | |
|---|---|
| *A47J 43/07* | (2006.01) |
| *A47J 36/10* | (2006.01) |
| *A47J 43/08* | (2006.01) |
| *A47J 43/046* | (2006.01) |
| *A47J 43/042* | (2006.01) |

(52) U.S. Cl.
CPC ............ *A47J 36/10* (2013.01); *A47J 43/042* (2013.01); *A47J 43/046* (2013.01); *A47J 43/0722* (2013.01); *A47J 43/0761* (2013.01); *A47J 43/085* (2013.01); *A47J 43/075* (2013.01); *A47J 43/0766* (2013.01); *A47J 43/0772* (2013.01); *A47J 43/0777* (2013.01)

(58) Field of Classification Search
CPC . A47J 43/0766; A47J 43/0772; A47J 43/0777
USPC .................... 241/37.5; 366/199, 205, 206
See application file for complete search history.

(56) References Cited

U.S. PATENT DOCUMENTS

| | | | |
|---|---|---|---|
| 5,544,573 A | 8/1996 | Gateaud | |
| 6,186,425 B1 * | 2/2001 | Celso De Almeida Mattos | A47J 43/046 241/100 |
| 8,240,909 B2 * | 8/2012 | Athey | A47J 43/0766 241/282.1 |
| 8,403,556 B2 | 3/2013 | Wu | |
| 9,775,467 B2 * | 10/2017 | Sapire | A47J 43/0722 |
| 9,839,326 B2 * | 12/2017 | Sapire | A47J 43/0716 |
| 2009/0189001 A1 * | 7/2009 | Huang | A47J 43/0777 241/37.5 |
| 2011/0248108 A1 | 10/2011 | Carriere | |
| 2012/0006921 A1 | 1/2012 | Maunoury et al. | |

(Continued)

FOREIGN PATENT DOCUMENTS

WO 2017031525 A1 3/2017

*Primary Examiner* — David L Sorkin
(74) *Attorney, Agent, or Firm* — Trojan Law Offices

(57) ABSTRACT

A blender for processing comestible matter includes a base with a motor, a blade assembly, and a container. The blender further comprises a first safety mechanism and a second safety mechanism. The first safety mechanism functions to ensure that the container is securely attached to the blade assembly before the blade assembly can be mounted to the base. The second safety mechanism functions to ensure the motor in the base can only be powered on when the container and the blade assembly are securely mounted to the base. The blender is operable by affixing the container to the blade assembly, and then the assembly to the base, such that both safety mechanisms are released to permit the motor to be activated.

12 Claims, 13 Drawing Sheets

(56) References Cited

U.S. PATENT DOCUMENTS

| | | | |
|---|---|---|---|
| 2014/0247686 A1* | 9/2014 | Arnett | A47J 43/046 366/205 |
| 2015/0098298 A1* | 4/2015 | Sapire | A47J 43/046 366/144 |
| 2015/0098299 A1 | 4/2015 | Sapire | |
| 2015/0216360 A1 | 8/2015 | Hosner | |
| 2015/0250360 A1 | 9/2015 | Hyp | |
| 2016/0296074 A1 | 10/2016 | Repac | |

* cited by examiner

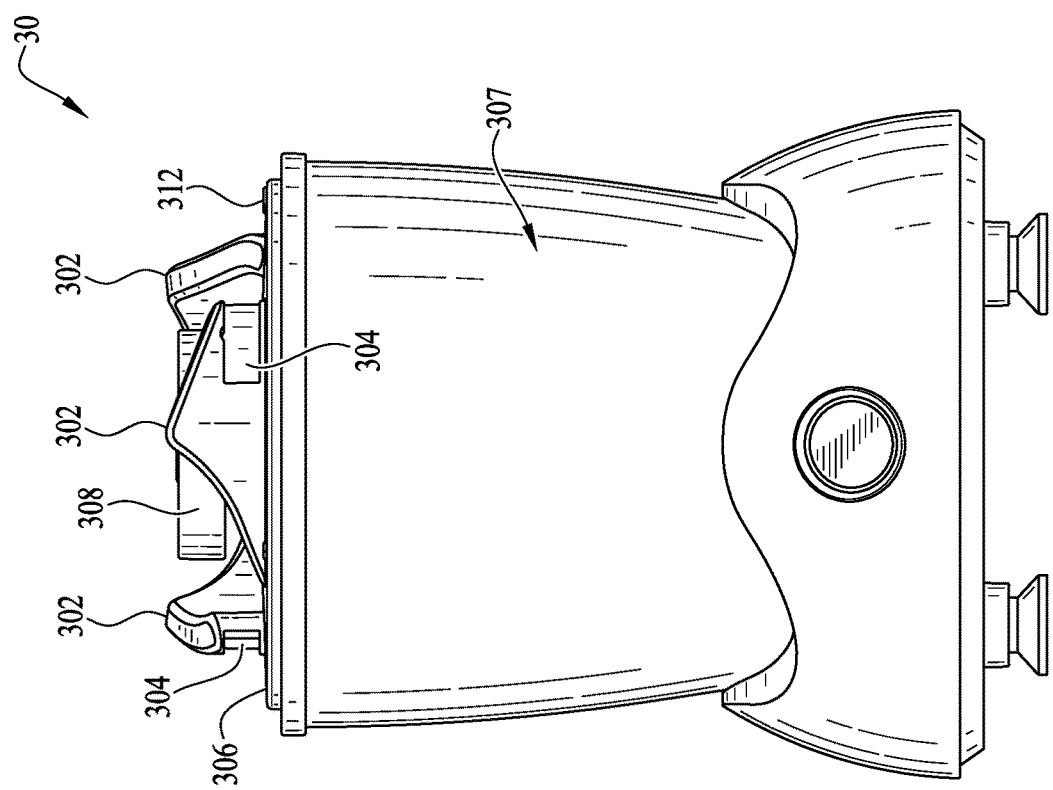
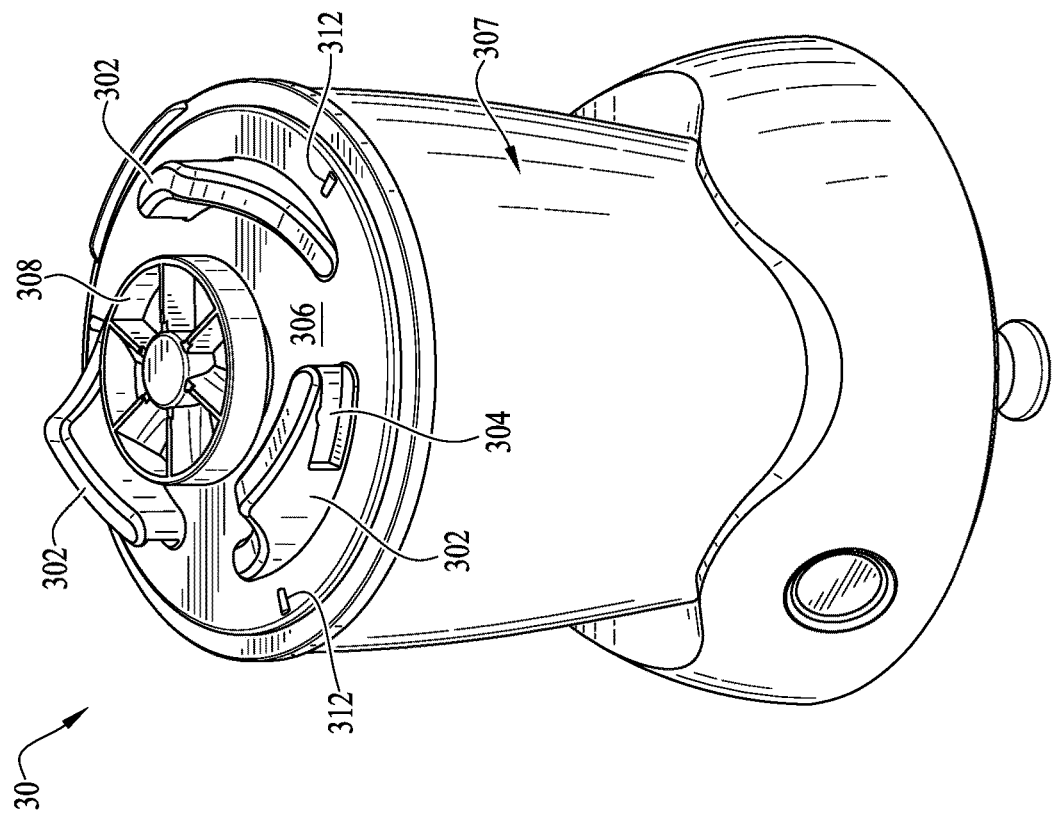

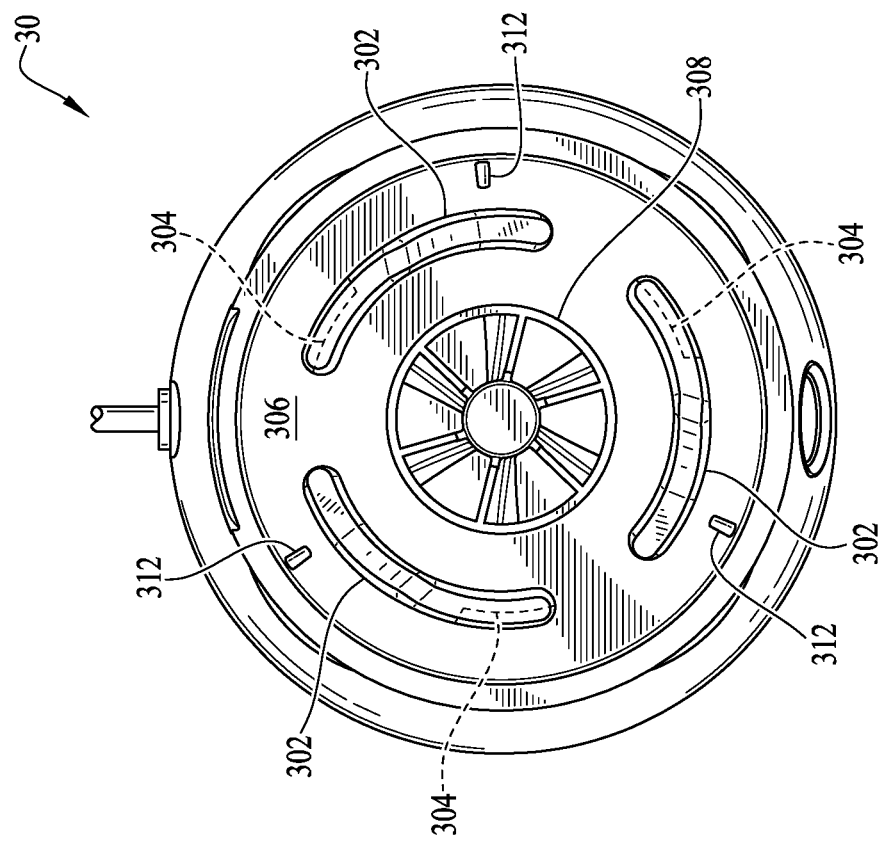
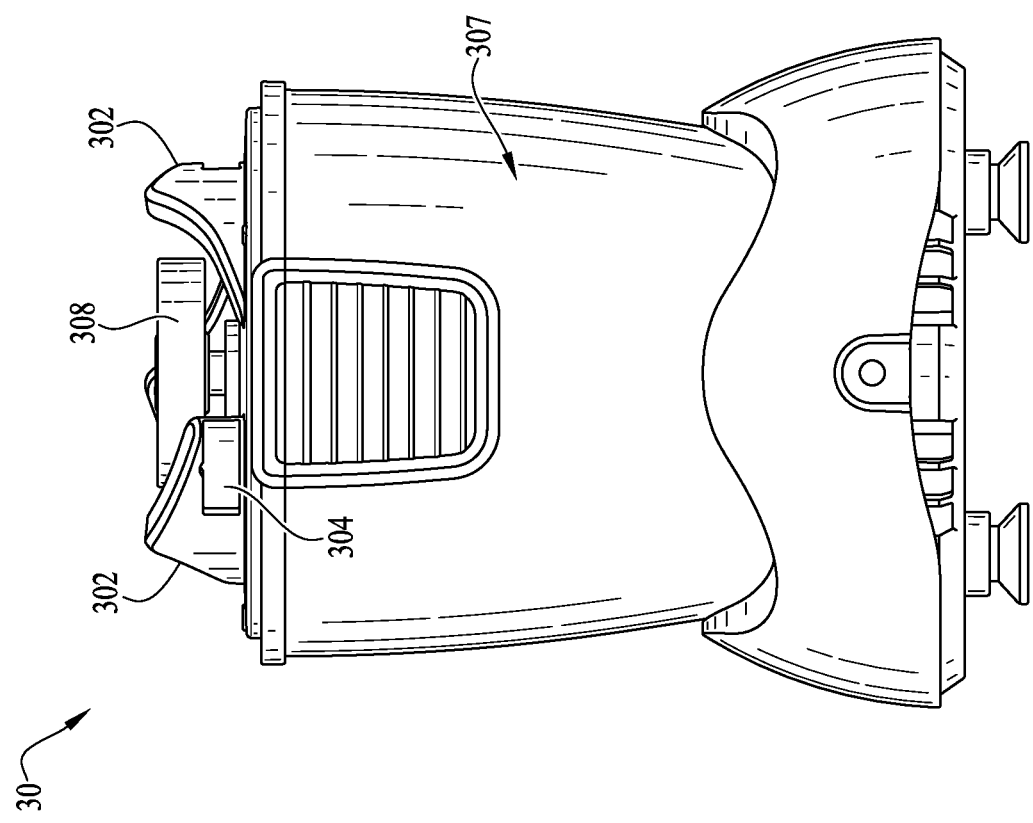

MIXER WITH SAFETY MECHANISMS

CROSS-REFERENCE TO RELATED APPLICATIONS

The application claims priority to and benefit of U.S. Provisional Patent Application No. 62/527,945, filed on Jun. 30, 2017, the content of which is incorporated by reference in its entirety.

FIELD OF THE INVENTION

The present invention relates to kitchen appliances. In particular, the present invention relates to blenders and food processors having safety features.

BACKGROUND OF THE INVENTION

Kitchen appliances such as blenders and food processors are well known. Such devices are typically capable of performing myriads of operations, such as mixing, blending, pulsing, pulverizing, chopping and cutting, which are generally referred to herein as processing. Such devices can process drinks and foods, generally referred to herein as comestible material.

Devices for processing comestible material are typically comprised of a container, a blade assembly, and a motor base. For instance, a typical countertop blender will have a container for holding the comestible material to be processed. The blender will have a blade assembly to perform the processing operation. In standard "upright" blenders, the blade assembly is integrally affixed to the bottom of the container. The container has an opening at the top, which is enclosed by a lid. The container is mounted to the base in an upright position.

For "inverted" blenders, the blade assembly is removably attached to the opening of the container so that it also functions as a lid. With these kinds of blenders, the container is inverted to mount the blade assembly to the base. In both upright and inverted blenders, the container and blade assembly are mounted on top of the base, which has a motor that drives the blades of the blade assembly to process the comestible material in the container.

To operate a typical blender, a user would put comestible material into the container, attach the blade assembly to close the container, and then mount the container and the blade assembly to the base. The user would then activate the motor, which drives the blades to process the comestible material in the container. Because the blades are sharp and spin at a very high speed and with great force, there is a potential of serious injury to the user if the blade assembly is not securely attached to the container when the motor is activated.

For example, there is a risk that the container may separate from the blade assembly if the container is not securely attached to the blade assembly when the motor is activated. If the container separates from the blade assembly when the motor is activated, this would create an extreme hazard because the whirling blades would be exposed. A user could suffer severe injury if he or she makes contact with the whirling blades. Thus, it is necessary to ensure that the container is locked to the blade assembly before the motor can be activated and at all times when the motor is in operation.

Further, there is also a potential of serious injury if the container and the blade assembly are not securely mounted on the base when the motor is activated. For example, if the container and blade assembly are not securely mounted on the base when the motor is activated, there is a risk that both the container and the blade assembly could come off the base, which would also be extremely hazardous because the impeller that drives the blades would be exposed and potentially cause injury to the user.

To minimize these types of risk, blenders have included safety features to protect the user. It is known for a blender to include a switch means to disable the motor if the container is not present on the base. Safety mechanisms also exist that prevent the motor from starting unless the container is properly mounted on the motor base. For example, U.S. Pat. No. 3,786,999 teaches that "[t]he jar must be inserted on a base member properly and twisted to a locked position to enable the base, which has a portion of the driven blade shaft in it, to be connected to the drive shaft of the blender." Other blenders have safety mechanisms to prevent the operation of the motor when the lid is not attached (e.g., U.S. Pat. No. 8,403,556) so that the blender cannot be powered on unless the lid is secured to protect the user from the spinning blades.

However, these kinds of safety mechanisms are inadequate to minimize the dangers described above. Most blenders known in the art teach the use of a single safety mechanism to protect against a single safety concern, such as when a container is improperly mounted on a base as described in U.S. Pat. No. 3,786,999. Current blenders do not employ a system of redundant safety mechanisms to minimize multiple dangers, such as when a container is improperly secured to a blade assembly or when the blade assembly is improperly mounted on the motor base.

It is an object of the invention to provide a blender having safety mechanisms.

It is an object of the invention to provide a blender with a safety mechanism for ensuring that the container is securely attached to the blade assembly.

It is an object of the invention to provide a blender with a safety mechanism for ensuring that the blade assembly is securely attached to the motor base.

It is an object of the invention to utilize at least two safety mechanisms to protect against different risks where the blade assembly is not properly attached to the container or where the blade assembly is not properly mounted on the base.

It is a further object of the invention that the safety mechanisms work redundantly.

SUMMARY OF THE INVENTION

In accordance with the objectives of the invention, the embodiments of the present invention relate to a blender. A blender is to be understood as any device capable of processing comestible material. The blender according to the present invention has coordinated safety mechanisms to prevent the blender from being turned on if the container is not properly attached to the blade assembly or if the blade assembly is not properly mounted on the base.

The blender according to the present invention has a first safety mechanism, which functions to ensure that the container is securely attached to the blade assembly before the blade assembly can be mounted to the base. In an embodiment, the first safety mechanism is comprised of blocking mechanism that prevents the blade assembly from being mounted onto the base when the container is not securely attached to the blade assembly. The blocking mechanism is comprised of an obstructing tab or equivalent structure that can move between a blocking position and an unblocking position. In the default blocking position, the blocking mechanism blocks the blade assembly from being mounted to the base.

To move the blocking mechanism so that the blade assembly can be mounted to the base, it is necessary to move the obstructing tab or equivalent structure into the unblocking position. This can be accomplished using a spring-loaded tab located in the blade assembly. When the container is attached to the blade assembly, the container will depress the spring-loaded tab, causing the blocking mechanism to move to the unblocking position to allow the blade assembly to be mounted on the motor base. In alternative embodiments of the invention, the first safety mechanism need not be comprised of a spring-loaded tab or other physical obstructing components, but can be comprised of a system of electronic emitters and detectors that can sense when the container is properly secured to the blade assembly.

In another embodiment of the invention, the blender includes a second safety mechanism that functions to ensure the motor in the base can only be powered on when the container and the blade assembly are securely mounted to the base. In a preferred embodiment, the second safety mechanism is comprised of an emitter and a corresponding detector that communicates to activate the motor. The emitter can be a magnetic element or any sensing element capable of communicating a signal. The detector can be a magnetic element or any element capable of receiving a signal. In a preferred embodiment, the emitter is located in the blade assembly and the detector is located in the base. (Conversely, the emitter can be in the base and the detector can be in the blade assembly.) The emitter communicates with the detector to activate the motor. In order for the emitter to communicate with the detector, the emitter has to be aligned with the detector. The emitter and the detector can only be aligned when the blade assembly is mounted on the base.

In an embodiment, the emitter in the blade assembly is attached to a spring-loaded tab that permits the second safety mechanism to move between an "off" position and an "on" position. The default position of the emitter is in the "off" position where it is not aligned with the detector, thereby preventing the emitter from communicating with the detector to activate the motor. In order to move the second safety mechanism to the "on" position to activate the motor, it is necessary to move the emitter into alignment with the detector by depressing the spring-loaded tab. The tab can only be depressed to align the emitter with the detector when the container is properly secured on the blade assembly. That is, when the container is securely attached to the blade assembly, the container will depress the spring-loaded tab to move the emitter into alignment with the detector. When the emitter is properly aligned with the detector, the motor in the base can be switched on.

In a preferred embodiment, the first and second safety mechanisms work in tandem. When the container is secured to the blade assembly, it will release both the first and the second safety mechanisms. Securing the container to the blade assembly will cause the blocking mechanism of the first safety mechanism to move to an unblocking position, while at the same time cause the emitter of the second safety mechanism to move into alignment with the detector in the base. With the first safety mechanism in the unblocking position, the blade assembly can be secured on the motor base. With the second safety mechanism in the "on" position, the motor can be activated.

Not only can the first and second safety mechanisms work in tandem, the safety mechanisms can also be redundant. For example, in a preferred embodiment, the motor will automatically shut off if the container becomes detached from the blade assembly because the emitter will move out of alignment with the detector. This ensures that the motor can never be activated if the container separates from the blade assembly or if the blade assembly separates from the base during operation.

BRIEF DESCRIPTION OF THE DRAWINGS

FIG. 14 is a perspective view of a base of the blade assembly in accordance with an embodiment of the present invention.

FIG. 15 is a side view of the base of the blade assembly in accordance with an embodiment of the present invention.

FIG. 16 is another side view of the base of the blade assembly accordance with an embodiment of the present invention, showing a base recess located on the top of the base.

FIG. 17 is a top view of the base of the blade assembly accordance with an embodiment of the present invention, showing nubs on the top of the base.

DETAILED DESCRIPTION OF EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and to fully convey the scope of the invention to those skilled in the art.

Figure 1:
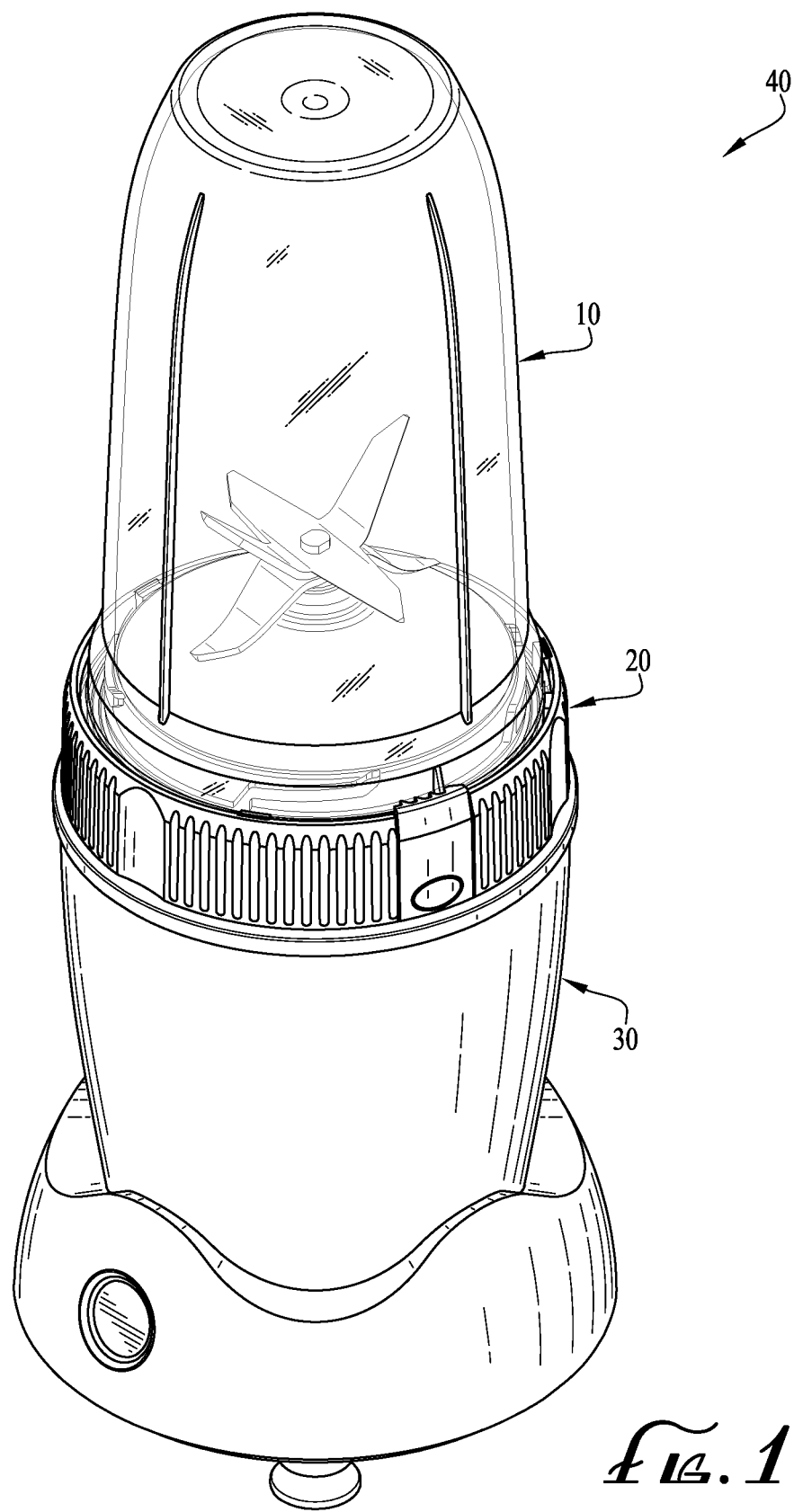
FIG. 1 is a perspective view of a blender in accordance with an embodiment of the present invention.
Figure 2:
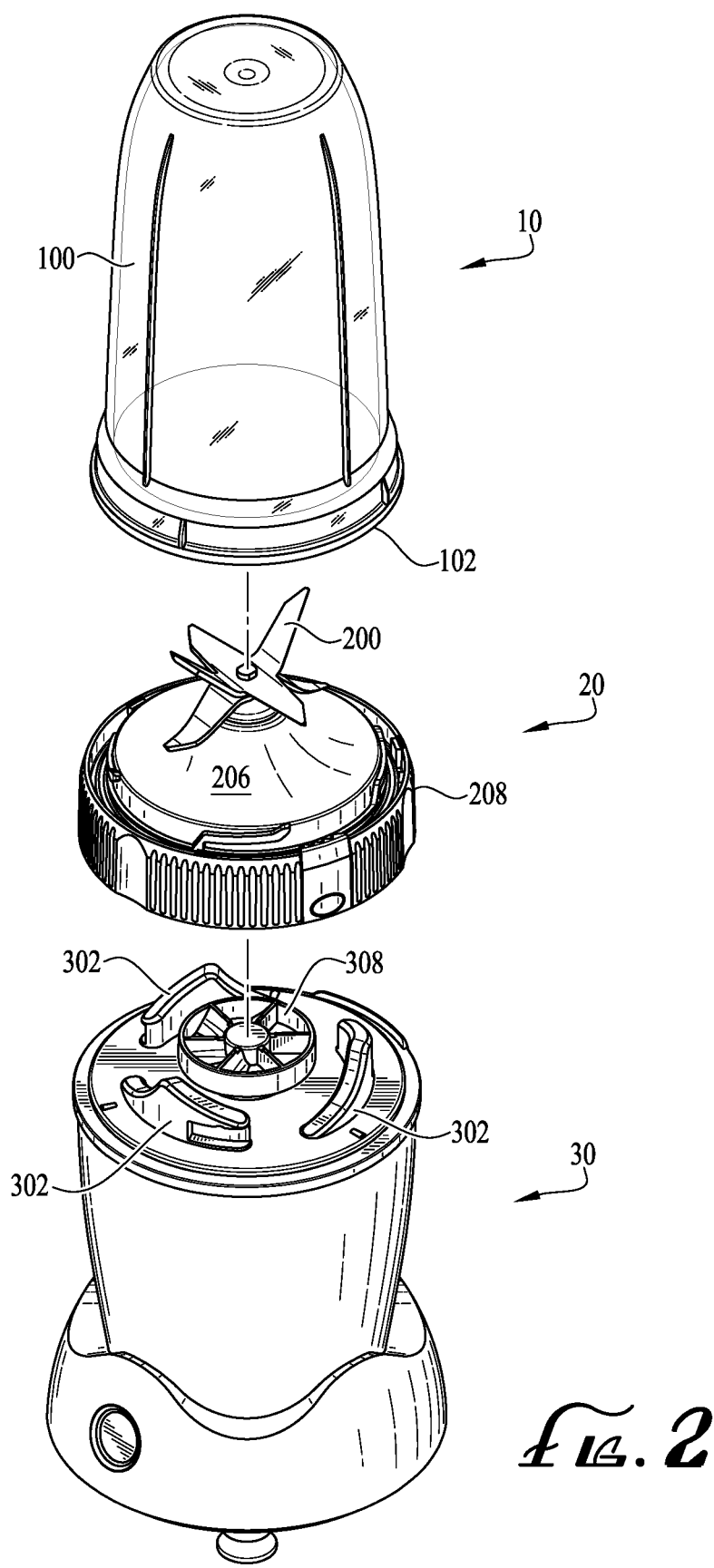
FIG. 2 is an exploded view of the blender in accordance with an embodiment of the present invention

As shown in FIG. 1, a blender 40 according to an embodiment of the invention is comprised of a container 10, a blade assembly 20, and a base 30. As further shown in the exploded view of FIG. 2, the blade assembly 20 is removably attached to the container 10 to form a closed space for processing comestible material. The blade assembly 20, with the container 10 attached, is removably mounted on the base 30.

Figure 3:
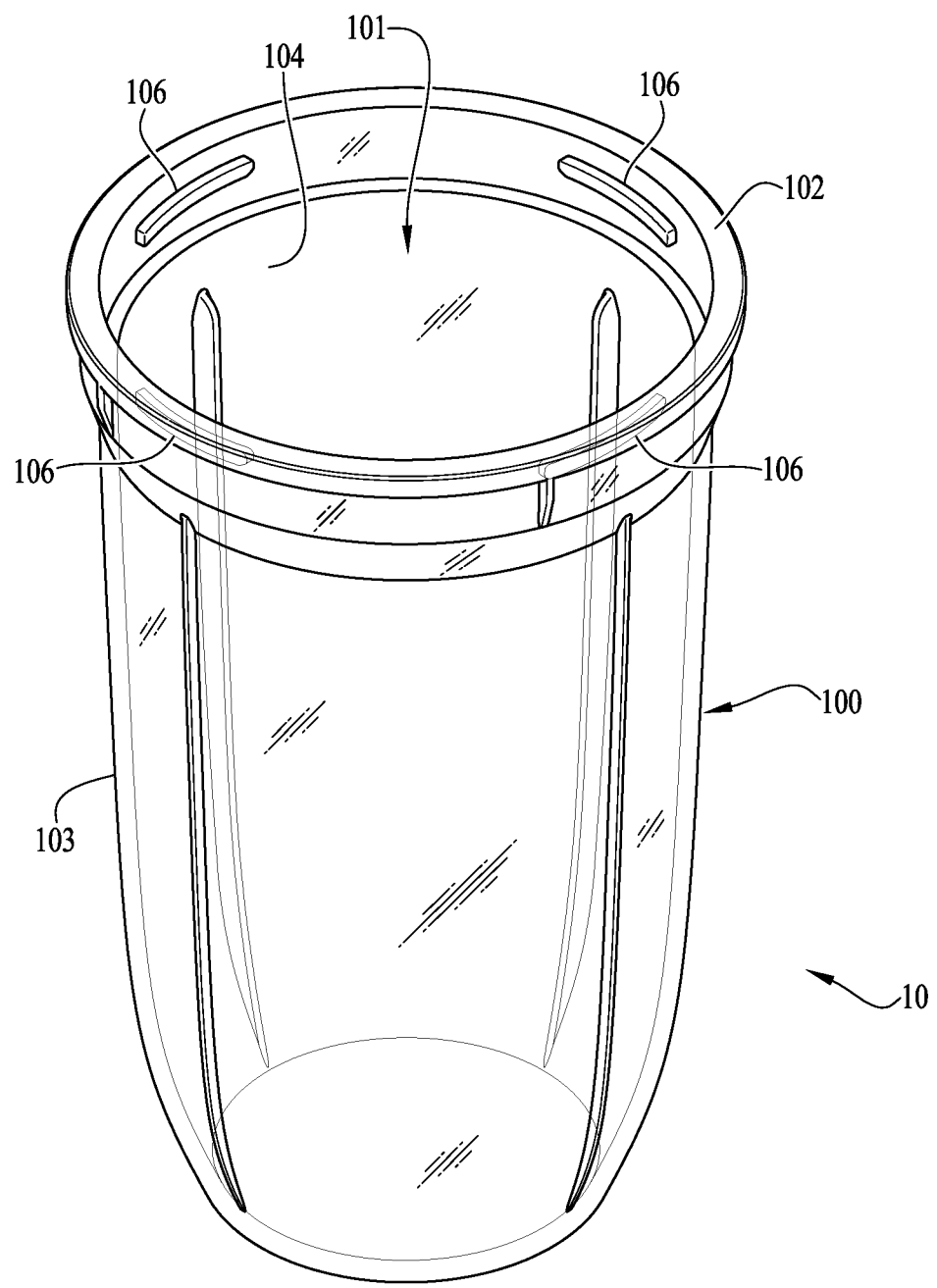
FIG. 3 is a perspective view of a container of the blender in accordance with an embodiment of the present invention.

Referring now to FIG. 3, the container 10 has a body 100 with an open-end 101 that is defined by a rim 102. In a preferred embodiment, the body 100 is to give shaped (i.e. bullet shaped), though it can have any shape that serves the intended function of the invention. The body 100 is further defined by an outer side 103 and an inner side 104.

To facilitate the attachment of the container 10 to the blade assembly 20, the container 10 has one or more tongue protrusions 106 located on the inner side 104 near the rim 102. As further described below, the tongue protrusions 106 engage with corresponding slots 214 on the blade assembly 20 to secure the container 10 to the blade assembly 20.

Figure 4:
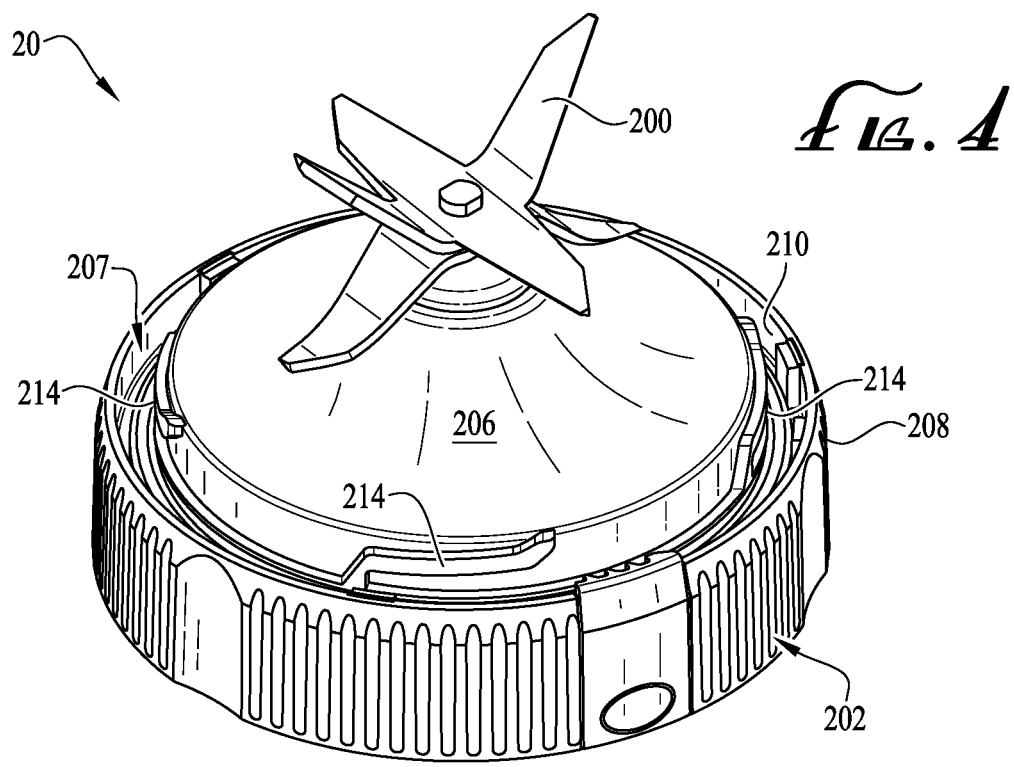
FIG. 4 is a top perspective view of a blade assembly in accordance with an embodiment of the present invention.
Figure 5:
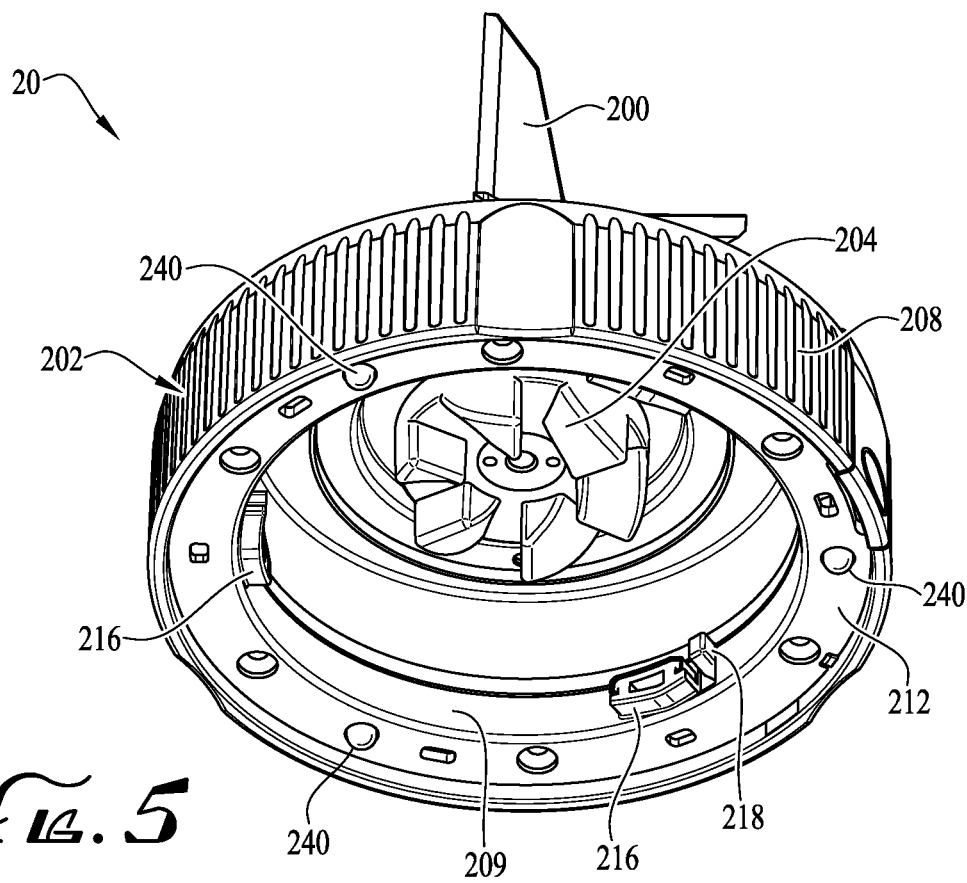
FIG. 5 is a bottom perspective view of the blade assembly in accordance with an embodiment of the present invention.
Figure 6:
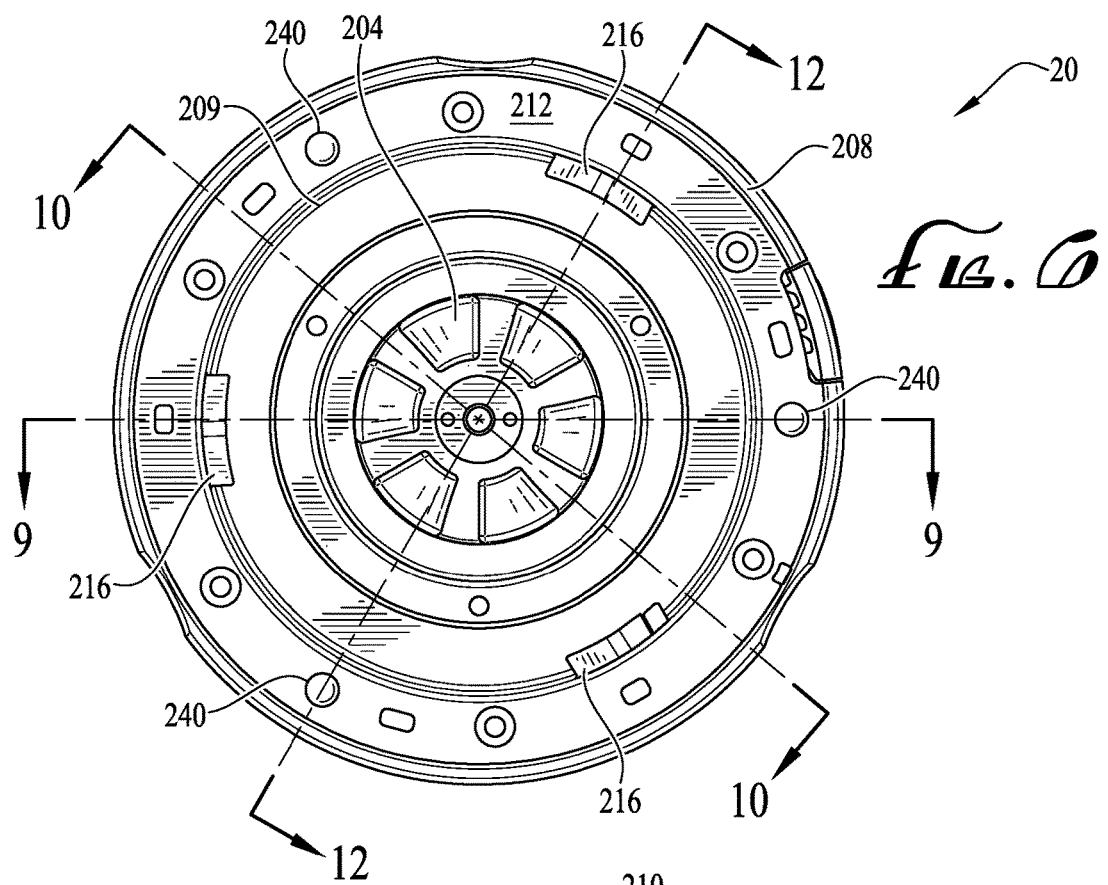
FIG. 6 is a bottom view of the blade assembly in accordance with an embodiment of the present invention, illustrating cross sections of FIG. 9, FIG. 10, FIG. 11 and FIG. 12.
Figure 7:
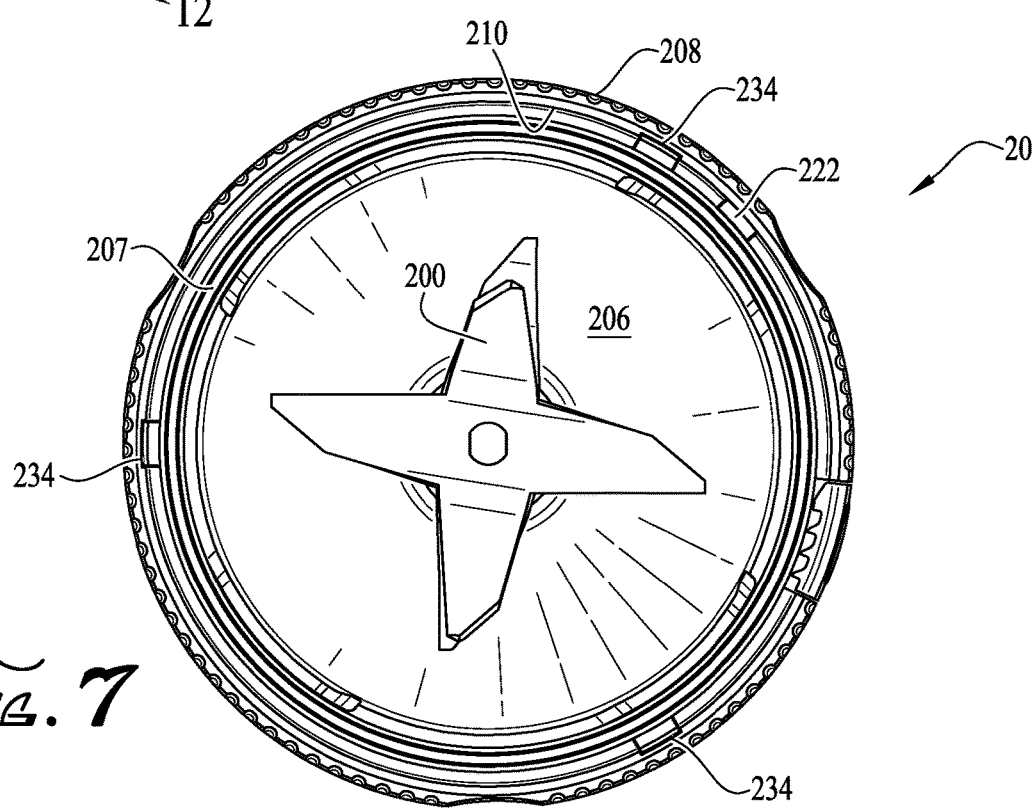
FIG. 7 is a top view of the blade assembly in accordance with an embodiment of the present invention.

Referring now to FIGS. 4 to 8, the blade assembly 20 is comprised of a blade or blades 200, a blade holder 202, and a blade impeller 204. As shown in FIGS. 5 and 6, the blade 200 is mounted on the blade holder 202 and connected to the blade impeller 204 such that the blade impeller 204 spins the blade 200.

Figure 11:
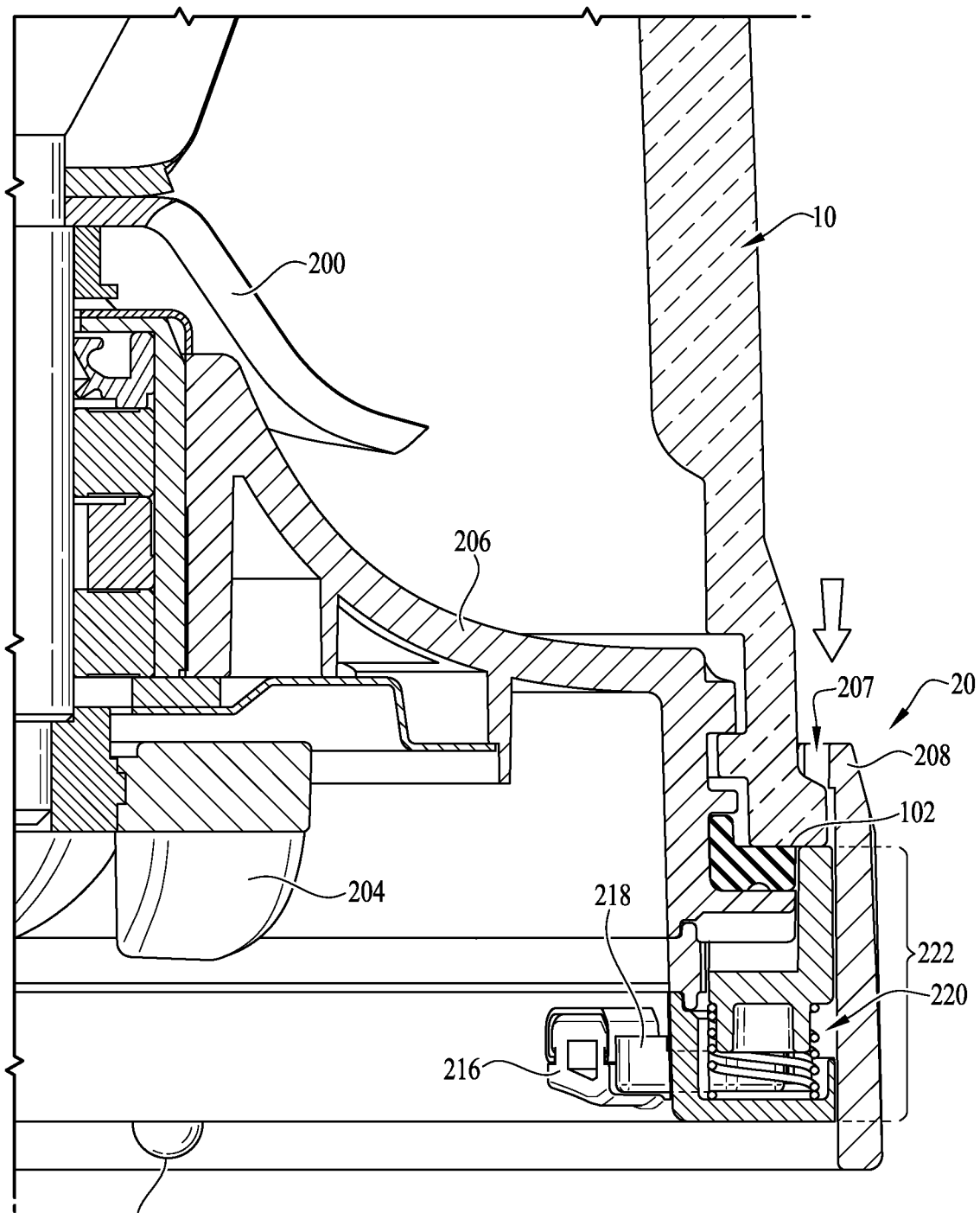
FIG. 11 is an illustrative view of the internal structure of the blade holder accordance with an embodiment of the present invention, showing the first safety mechanism in an unblocking position.

As best shown in FIG. 4, the blade holder 202 has an interior surface 206 extending from the blade 200 and connecting to a collar 208, forming a trench 207 between the interior surface 206 and the collar 208. The collar 208 has a top collar wall 210 as shown in FIG. 4 and a bottom collar rim 212 as shown in FIG. 5. The shape of the collar 208 is complementary to the shape of rim 102 of the container 10. In a preferred embodiment, the collar 208 has a greater circumference than the rim 102 such that the rim 102 fits within the trench 207 to seal the open-end 101 of container 10 as shown in FIGS. 1 and 11. In this way, when the blade assembly 20 is attached to the container 10, the interior surface 206 forms a closed end for the container 10.

Figure 8:
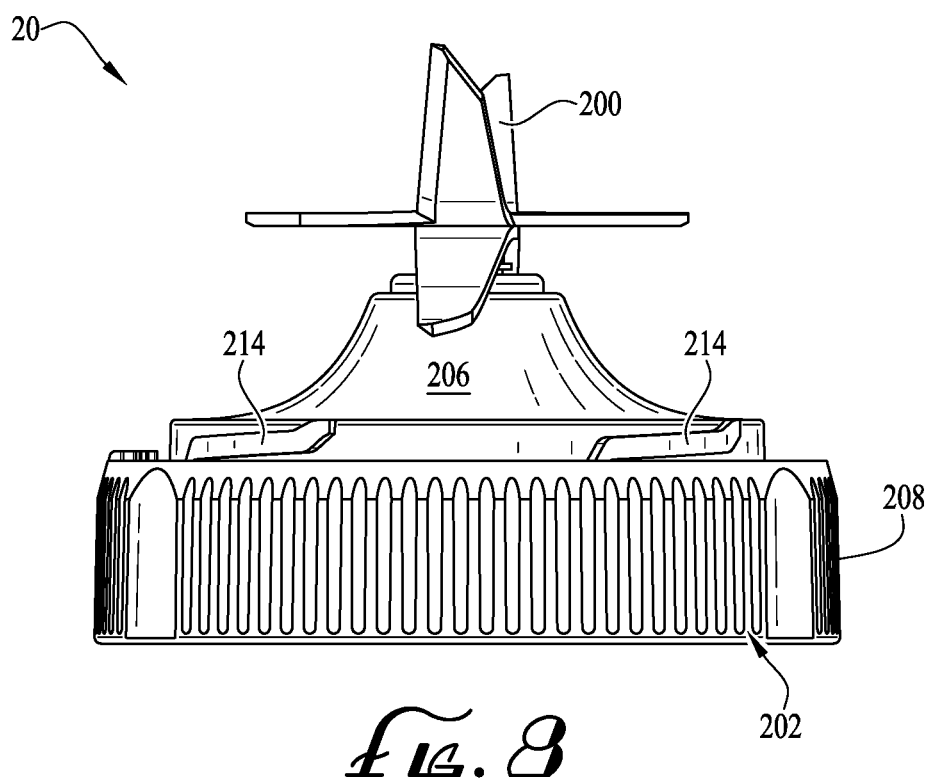
FIG. 8 is a side view of the blade assembly accordance with an embodiment of the present invention having an interior surface and an exterior surface.

As further shown in FIG. 4 and FIG. 8, the blade holder 202 has one or more slots 214 on the interior surface 206 for engaging the tongue protrusions 106 on the container 10. In a preferred embodiment, the container 10 is attached to the blade assembly 20 by rotating the tongue protrusions 106 into the slots 214. When the tongue protrusions 106 are secured in the slots 214, the rim 102 of the container 10 rests in trench 207, between the interior surface 206 and the collar 208 to seal the open end 101 of the container 10.

Referring now to FIGS. 5 and 6, the blade holder 202 has a plurality of blade holder protrusions 216. In a preferred embodiment, the blade holder protrusions 216 are located on an interior side wall 209 of the collar 208 approximate to the bottom collar rim 212. The blade holder protrusions 216 function to secure the blade assembly 20 to the base 30 as described below. In a preferred embodiment, the blade holder 202 has three blade holder protrusions 216 equally spaced apart on the interior side wall 209 of the collar 208 as best shown in FIG. 6.

Referring now to FIGS. 14 to 17 of the base 30, the base 30 has a motor (not shown) for driving a motor impeller 308 that is engaged with the blade impeller 204 when the blade assembly 20 is properly mounted on the base 30.

In a preferred embodiment as shown in FIG. 14, the base 30 has a top surface 306 and a base body 307. The motor impeller 308 is mounted at the center of the top surface 306 as best shown in FIG. 17.

As shown in FIGS. 14 and 17, the base 30 has one or more ramps 302 on the top surface 306 surrounding the motor impeller 308. In a preferred embodiment, the base 30 has three ramps 302 equally spaced apart on the top surface 306. As shown in FIGS. 14 and 15, each ramp 302 has a recess 304 for receiving the blade holder protrusion 216 of the blade assembly 20. The recess 304 has a shape that is complementary to the shape of the blade holder protrusion 216 such that the blade holder protrusion 216 can slide into the recess 304.

The blade assembly 20 is mounted on the base 30 by coupling the blade impeller 204 with the motor impeller 308 and by engaging the blade holder protrusions 216 with the recesses 304. When the blade assembly 20 is placed on top of the base 30, the ramps 302 will guide the blade assembly 20 until the bottom collar rim 212 is substantially resting on the top surface 306, such that each blade holder protrusion 216 is substantially aligned with a corresponding recess 304. The blade assembly 20 can be securely mounted to the base 30 by rotating the blade assembly 20 so that blade holder protrusions 216 slide into the recesses 304.

Figure 10:
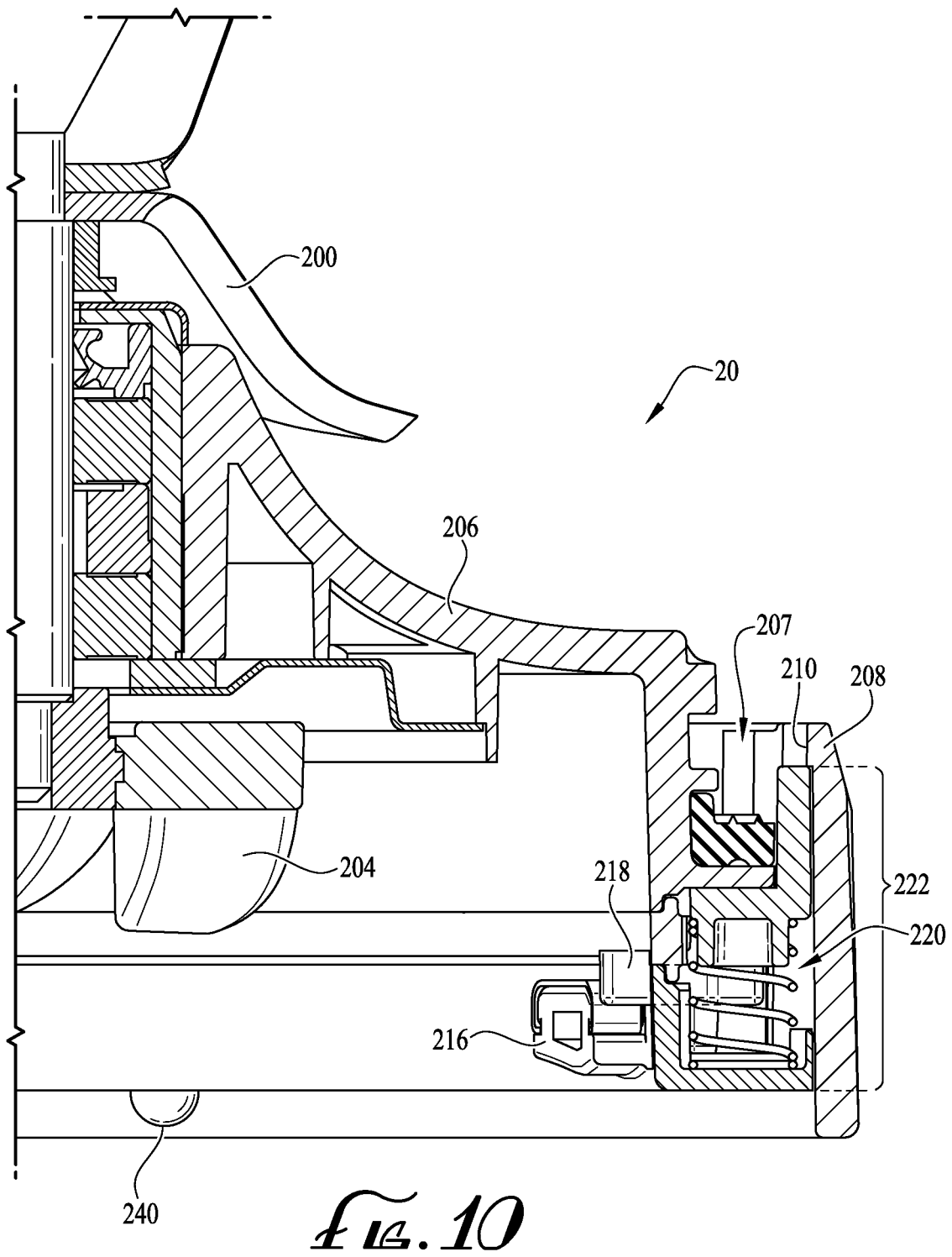
FIG. 10 is an illustrative view of the internal structure of the blade holder accordance with an embodiment of the present invention, showing the first safety mechanism in a blocking position.

Referring now to FIGS. 10 and 11, the blender 40 according to the present invention has at least a first safety mechanism 220. The first safety mechanism 220 functions to ensure that the container 10 is securely attached to the blade assembly 20 before the blade assembly 20 can be mounted to the base 30.

Figure 9:
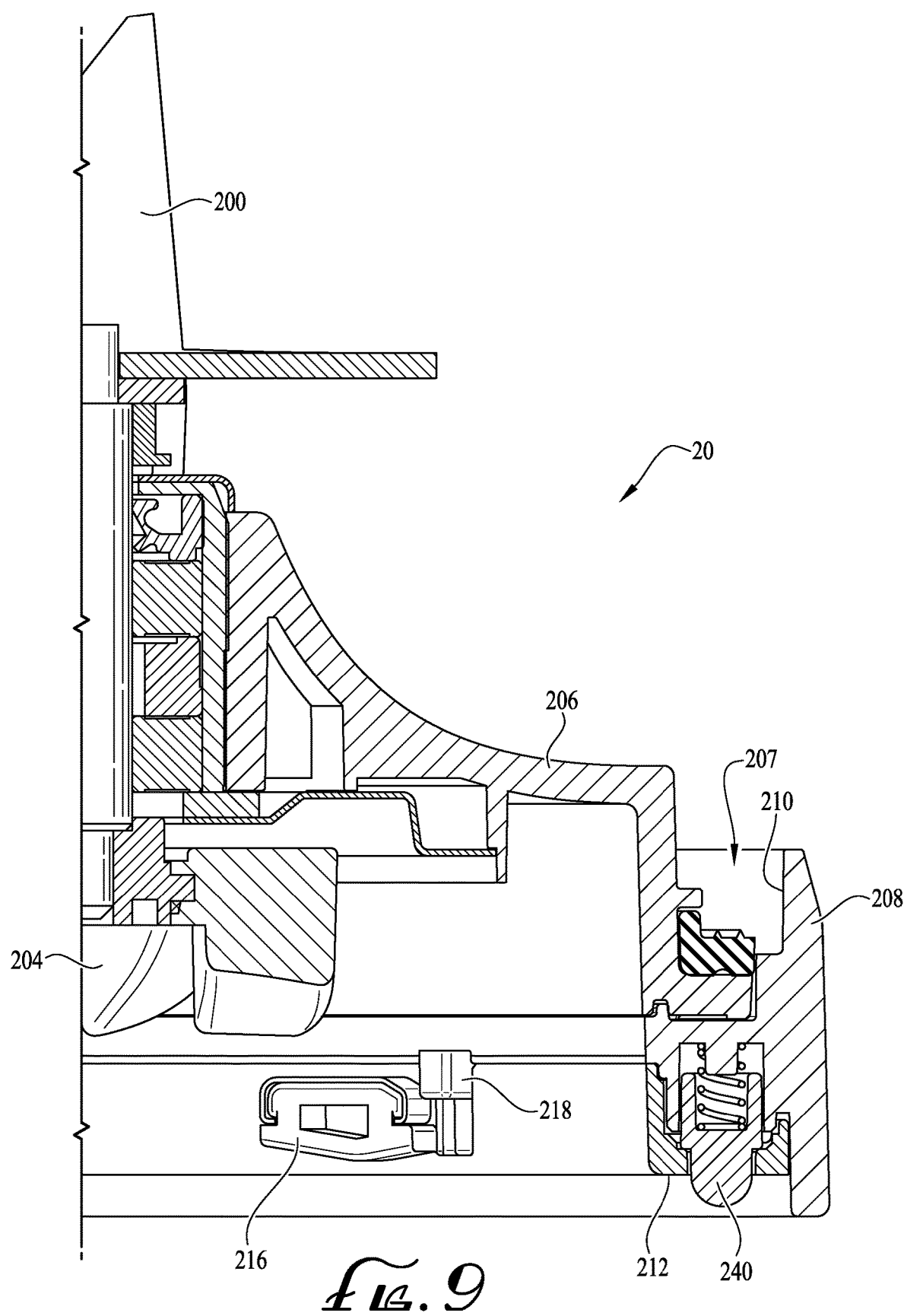
FIG. 9 is an illustrative view of the internal structure of a blade holder in accordance with an embodiment of the present invention, showing a retractable ball and a first safety mechanism.

Referring again to FIGS. 5 and 6, an embodiment of the first safety mechanism 220 comprises a blocking member 218. The blocking member 218 is located adjacent to one of the blade holder protrusions 216 as shown in FIG. 9. The blocking member 218 is capable of moving between a blocking position, as shown in FIG. 10, and an unblocking position as shown in FIG. 11. In the blocking position shown in FIG. 10, the blocking member 218 functions to block the blade holder protrusion 216 from sliding into the recess 304 of the ramp 302 so as to prevent the blade assembly 20 from being mounted to the base 30.

More particularly, the blocking member 218 is connected to a first spring-loaded tab 222. The first spring-loaded tab 222 can be a spring or any other resilient material, such as a plastic polymer, which can be compressed to move the blocking member 218. The top of the first spring-loaded tab 222 protrudes from an opening in the trench 207 adjacent to the collar 208 of the blade assembly 20 as shown in FIG. 10.

When the first spring-loaded tab 222 is in its default position (i.e. uncompressed state), as shown in FIG. 10, the blocking member 218 is in the "blocking" position because it is not aligned with the blade holder protrusion 216. When the container 10 is attached the blade assembly 20 as shown in FIG. 11, the rim 102 depresses the first spring-loaded tab 222. Depressing the spring-loaded tab 222 causes the blocking member 218 to move to the "unblocking" position where the blocking member 218 is substantially aligned with the blade holder protrusion 216. If the container 10 is detached from the blade assembly 20, the first spring-loaded tab 222 returns to its default "blocking" position in FIG. 10.

Thus, the blade assembly 20 can only be mounted to the base 30 by rotating the blade holder protrusions 216 into the recess 304 (shown in FIGS. 14 and 15) when the container 10 is attached to the blade assembly 20. The blade holder protrusion 216 can only enter the recess 304 when the rim 102 of the container 10 depresses the first spring-loaded tab 222 to move the blocking member 218 into alignment with the blade holder protrusion 216. If the container 10 is detached from the blade assembly 20, the blocking member 218 returns to the default position depicted by FIG. 10, thereby blocking the blade holder protrusion 216 from entering the recess 304.

Figure 12:
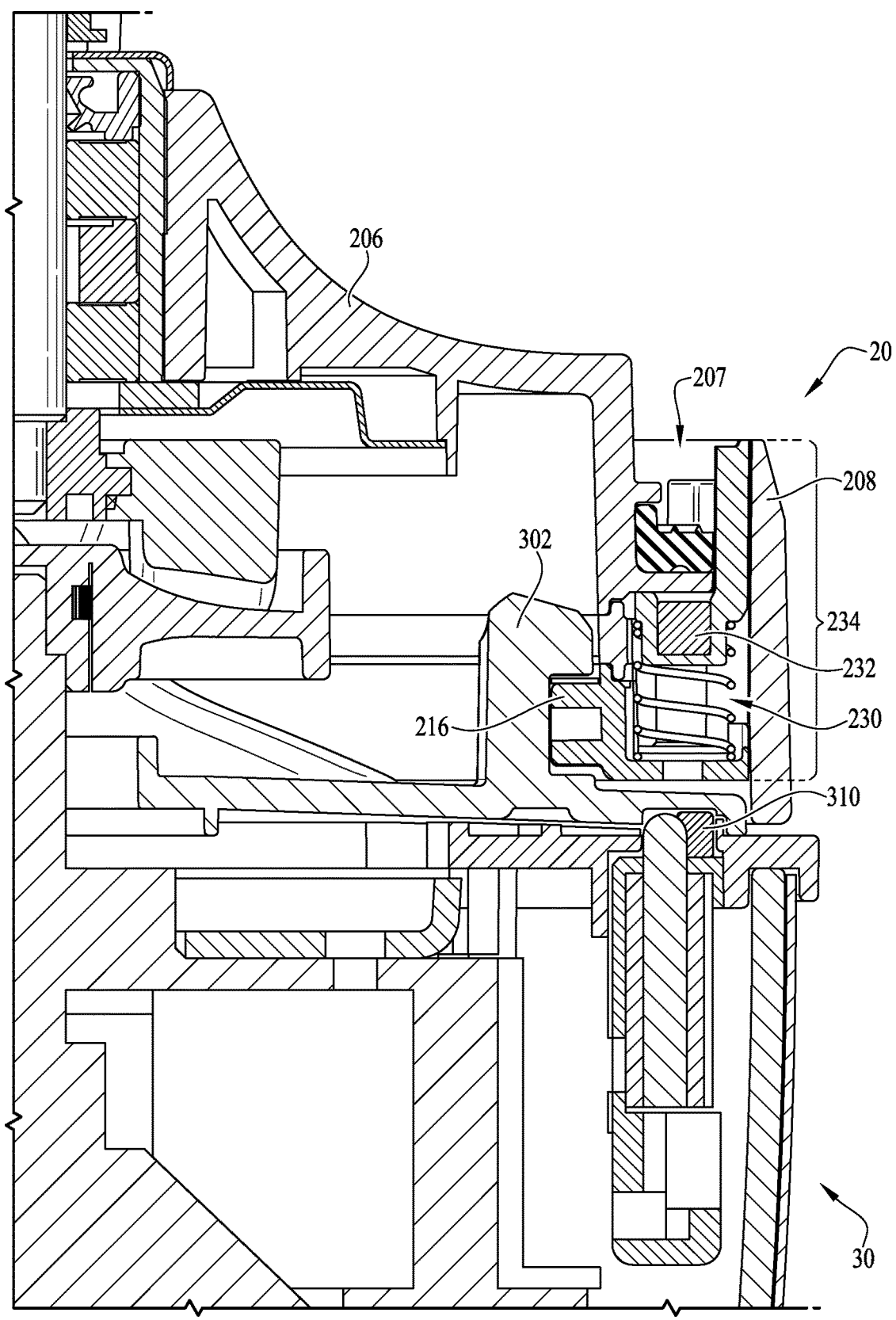
FIG. 12 is an illustrative view of the internal structure of the blade holder accordance with an embodiment of the present invention, showing an emitter element of a second safety mechanism in an off position.
Figure 13:
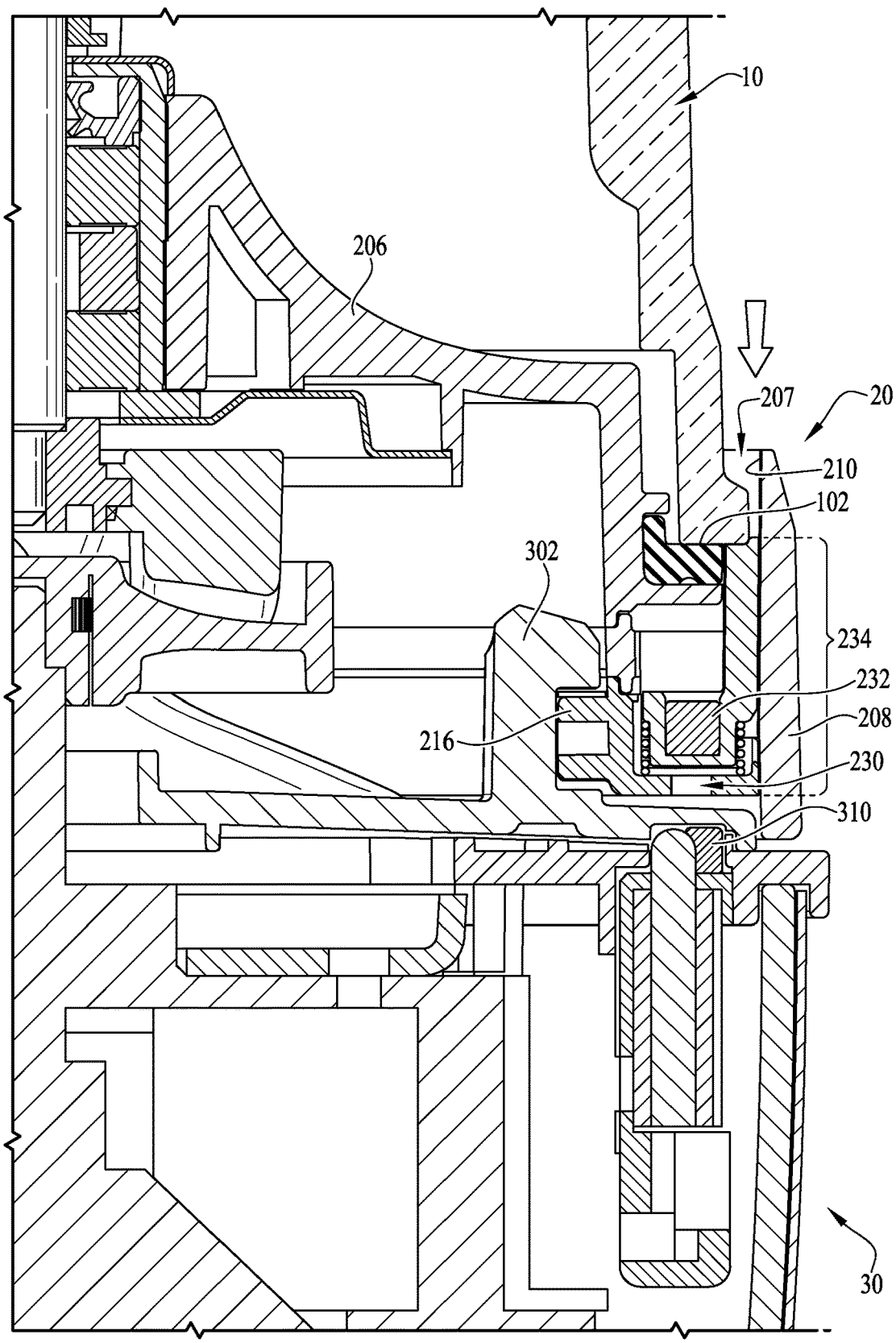
FIG. 13 is an illustrative view of the internal structure of the blade holder accordance with an embodiment of the present invention, showing a emitter element of a second safety mechanism in an on position.

An embodiment of the blender 40 also has a second safety mechanism 230 as shown in FIGS. 12 and 13. The second safety mechanism 230 functions to ensure the motor in the base 30 can only be switched on when the container 10 and the blade assembly 20 are securely mounted to the base 30.

As shown in FIGS. 12 and 13, the second safety mechanism 230 is comprised of an emitter 232 in the blade holder 202 and a corresponding detector 310 in the base 30. The emitter 232 can be a magnet, a laser, or any similar device capable of sending a signal such as a radio frequency. The second safety mechanism 230 is capable of moving between an "off" position, as shown in FIG. 12, and an "on" position, as shown in FIG. 13. In the "on" position, the emitter 232 is aligned with the detector 310 to enable the motor in the base 30 to be activated. In the "off" position, the emitter 232 is not aligned with the detector 310, which causes the motor to be turned off.

Referring more particularly to FIG. 12, the emitter 232 is connected to a second spring-loaded tab 234, which protrudes from an opening in the trench 207 adjacent to the top collar wall 210 of the blade holder 202. In an embodiment, the second spring-loaded tab 234 is adjacent to the first spring-loaded tab 222. The second spring-loaded tab 234 can be a spring or any other resilient material, such as a plastic polymer, which can be compressed to move between the "off" position (FIG. 12) and the "on" position (FIG. 13).

The emitter 232 is capable of interacting with the detector 310 in the base 30 to activate the motor. The detector 310 is a component capable of receiving magnetic signals, optical signals, or radio signals from the emitter 232. For example, if the emitter 232 is a magnet, the detector 310 could be a corresponding reed switch. In the preferred embodiment, the detector 310 is located at a terminal end of the recess 304 in ramp 302 such that the emitter 232 aligns with the detector 310 only when the blade holder protrusion 216 is fully inserted into the recess 304.

In the default "off" position as shown FIG. 12, the detector 310 does not receive a signal from the emitter 232 because the emitter 232 is not aligned with the detector 310. Thus, when the emitter 232 is not aligned with the detector 310, the motor in the base 30 cannot be powered on. In order to power on the motor, it is necessary to move the emitter 232 into alignment with the detector 310 as shown FIG. 13. The emitter 232 moves into alignment with the detector 310 when the second spring-loaded tab 234 is fully depressed. When the container 10 is mounted on the blade assembly 20 as shown in FIG. 13, the rim 102 of the container 10 depresses the second spring-loaded tab 234 to move the emitter 232 into alignment with the detector 310 to switch the second safety mechanism 230 to the "on" position. When the second safety mechanism 230 is in the "on" position, the detector 310 receives a signal from the emitter 232 to activate the motor in the base 30.

If the container 10 is removed from the blade assembly 20, the second-spring loaded tab 226 will return to its default "off" position and the emitter 232 will be out of alignment with the detector 310, thereby causing the motor to be automatically shut off.

The first safety mechanism 220 and second safety mechanism 230 work in tandem and are redundant to ensure that the container 10 is properly secured to the blade assembly 20 before the motor in the base 30 can be powered on or stay on. For example, when the container 10 is mounted on the blade assembly 20, the rim 102 of container 10 will depress both the first spring-loaded tab 222 and the second spring-loaded tab 234 simultaneously. As a result, the first safety mechanism 220 will be toggled to the "unblocking" position and the second safety mechanism 230 will be toggled to the "on" position simultaneously to activate the motor in the base 30. The second safety mechanism 230 is redundant to the first safety mechanism 220 because if the container 10 becomes detached from the blade assembly 20 while the blade assembly 20 is mounted on the base 30, the second safety mechanism 230 will be toggled "off" since the rim 102 of container 10 will no longer depress the second spring-loaded tab 234. Thus, the redundant safety feature will shut off the motor in the base 30 if the container 10 becomes detached during the operation of blender 40.

In another embodiment of the invention as illustrated in FIG. 9, the blade assembly 20 includes at least one retractable ball 240 that protrudes from the bottom collar rim 212 of the blade assembly 20. The retractable ball 240 is connected to the second spring-loaded tab 234 in the collar 208.

When the blade assembly 20 is affixed to the base 30 by rotating the blade holder protrusions 216 into the recesses 304, the retractable ball 240 slides along the top surface 306 before coming into contact with at least one nub 312 on the top surface 306 as shown in FIG. 17. The nub is positioned on top surface 306 such that the retractable ball 240 comes into contact with nub 312 when the blade holder protrusion 216 reaches the terminal end of the recess 304. As the retractable ball 240 passes over the nub 312, it retracts and then springs back into place, making an audible sound, such as a "clicking" noise. The audible sound informs the user that the blade holder protrusion 216 has reached the terminal end of the recess 304 and therefore a secure connection has been formed between the blade assembly 20 and the base 30. The user can confirm that the blade assembly 20 is secured on the base 30 by the audible "click" from the retractable ball 230.

While illustrative embodiments of the invention have been described in detail above, it is to be understood that the appended claims are intended to be construed to include variations of the present invention.

What is claimed is:

1. A blender comprising:
   a container, said container having an open-end;
   a blade assembly, said blade assembly having:
     a blade holder, said blade holder having an interior surface, a collar, and a bottom collar rim formed as a unitary structure; and,
     a blade, said blade being mounted upon a drive shaft wherein said drive shaft passes through the center of said interior surface;
   wherein said blade assembly is removably affixed to said open-end of said container;
   a base, said base having:
     a motor for operating said blender when said blade assembly is mounted on said base;
     a first safety mechanism within said blade assembly movable between a first position and a second position;
       wherein in said first position said first safety mechanism physically blocks said blade assembly from being operationally affixed on said base;
       wherein in second position said first safety mechanism does not physically block said blade assembly from being operationally affixed on said base; and, wherein said first safety mechanism moves into said second position only when said container is affixed to said blade assembly;
a second safety mechanism movable between a third position and a fourth position, said second safety mechanism having at least one emitter capable of communicating with at least one detector to enable said motor to be activated;
  wherein in said third position said emitter cannot communicate with said detector;
  wherein in said fourth position said emitter communicates with said detector to enable said motor to be activated; and,
  wherein said second safety mechanism moves into said fourth position only when said container is affixed to said blade assembly;
whereby said blade assembly can only be operationally affixed to said base when said first safety mechanism is in said second position by affixing said container to said blade assembly;
whereby said motor can only be activated when said second safety mechanism is in said fourth position by affixing said container to said blade assembly; and,
whereby said motor is activated to operate said blender only when said first safety mechanism is in said second position and said second safety mechanism is simultaneously in said fourth position;
whereby said first safety and said second safety mechanism operate in tandem at the point of said container and said blade assembly attachment, ensuring said container is affixed to said blade assembly before said blade assembly can be operationally affixed to said base and said motor can be activated.

2. The blender according to claim 1, said blade assembly further comprising:
  said blade holder having at least one blade holder protrusion;
  a blade impeller connected to said blade holder;
  said blade impeller is further connected to said drive shaft.

3. The blender according to claim 2, said base further comprising:
  a motor impeller driven by said motor; and,
  at least one base recess for receiving said at least one blade holder protrusion;
  wherein said blade assembly is operationally affixed to said base by coupling said blade impeller with said motor impeller and engaging said at least one blade holder protrusion with said at least one base recess.

4. The blender according to claim 3, wherein said first safety mechanism comprises:
  at least one movable first tab located in said blade holder;
  a blocking member connected to said first tab, said blocking member located adjacent to said at least one blade holder protrusion;
  wherein said blocking member prevents said at least one blade holder protrusion from entering said at least one base recess when said blocking member is in said first position;
  wherein when said container is affixed to said blade holder, said container depresses said first tab such that said blocking member moves to said second position to allow said at least one blade holder protrusion to enter said at least one base recess.

5. The blender according to claim 4:
  said at least one emitter in said blade assembly; and,
  said at least one detector in said base.

6. The blender according to claim 5, said second safety mechanism further comprising:
  at least one moveable second tab located in said blade holder;
  said emitter connected to said at least one moveable second tab;
  wherein when said container is affixed to said blade holder, said container depresses said second tab such that said at least one emitter moves from said third position to said fourth position to enable said motor to be activated.

7. The blender according to claim 6, wherein said at least one emitter is a magnet and said at least one detector is a reed switch.

8. The blender according to claim 7, wherein said at least one emitter is a RFID chip and said at least one detector is a RFID chip detector.

9. The blender according to claim 4, further comprising:
  at least one nub on said base;
  at least one retractable ball on said blade assembly;
  wherein when said blade assembly is operationally affixed to said base, said at least one retractable ball comes in contact with said at least one nub to make an audible sound.

10. The blender according to claim 9, wherein:
  said at least one nub is positioned that said at least one retractable ball comes into contact with at least one nub when said blade holder protrusion reaches a terminal end of the recess, such that said audible sound indicates that said blade holder protrusion has reached said terminal end of said recess.

11. A blender comprising:
  a container with an open-ended side defined by a rim;
  a blade assembly comprising:
    a blade holder, said blade holder having an interior surface, a collar, and a bottom collar rim formed as a unitary structure and at least one blade holder protrusion;
    a blade impeller mounted to said blade holder; and,
    a blade, said blade mounted upon a drive shaft wherein said drive shaft passes through the center of said interior surface and is connected to said blade impeller;
  a base comprising:
    a motor;
    an impeller driven by said motor; and,
    at least one base recess;
  wherein said container is configured to be affixed to said blade assembly;
  wherein said blade assembly is configured to be operationally affixed to said base by engaging said blade holder protrusion with said base recess;
  a first safety mechanism comprising:
    a blocking member moveable between a blocking position and an unblocking position;
    wherein said blocking member prevents said at least one blade holder protrusion from engaging with said base recess in said blocking position; and,
    wherein said blocking member does not prevent said at least one blade holder protrusion from engaging said base recess in said unblocking position;
    wherein when said container is affixed to said blade assembly, said container rim depresses said first safety mechanism member into said unblocking position; and,
  a second safety mechanism comprising:
    at least one detector capable of communicating with at least one emitter to activate said motor;

wherein said emitter is moveable between an off position, such that said emitter is not in alignment with said detector, and an on position, such that said emitter is in alignment with said detector;

wherein said emitter communicates with said detector to activate said motor when said emitter is in said on position;

wherein when said container is affixed to said blade assembly, said container rim depresses said second safety mechanism emitter into said on position; and, whereby said blade assembly can only be operationally affixed to said base when said container is affixed to said blade assembly;

whereby said motor can only be activated when said container is affixed to said blade assembly;

whereby said blender can only be operated when said blocking mechanism is in said unblocking position, whereby said blade assembly can be operationally affixed to said base, and said emitter is simultaneously in said on position, whereby said motor can be activated;

whereby said first safety and said second safety mechanism operate in tandem at the point of said container and said blade assembly attachment, ensuring said container is affixed to said blade assembly before said blade assembly can be operationally affixed to said base and said motor can be activated.

12. The blender according to claim 1, further comprising:

a third safety mechanism movable between a fifth position and a sixth position;

wherein said blender is operable by:
    affixing said container to said blade assembly, such that said first safety mechanism moves from said first position to said second position;
    said second safety mechanism moves from said third position to said fourth position;
    said third safety mechanism moves from said fifth position to said sixth position;

whereby said motor is activated to operate only when said first safety mechanism is in said second position, said second safety mechanism is simultaneously in said fourth position, and said third safety mechanism is simultaneously in said sixth position.

* * * * *